Patented Feb. 9, 1954

2,668,809

UNITED STATES PATENT OFFICE 2,668,809

PREPARATION OF HIGH VISCOSITY POLYVINYL ALCOHOL

Harold W. Bryant, Kenmore, N. Y., and William R. Cornthwaite, Wilmington, Del., assignors to E. I. du Pont de Nemours & Company, Wilmington, Del., a corporation of Delaware No Drawing. Application November 22, 1949, Serial No. 128,926

8 Claims. (Cl. 260—91.3)

This invention relates to the production of polyvinyl alcohol and more particularly to a method for producing a polyvinyl alcohol of unusually high viscosity.

In the manufacture of polyvinyl alcohol by saponification of polyvinyl acetate, the properties of the product may be varied over a considerable range by varying the conditions of polymerization in making the polyvinyl acetate and varying the methods and conditions under which the polyvinyl acetate is reacted with water or an alcohol to produce the polyvinyl alcohol. One property which is important in most commercial utilizations of polyvinyl alcohol is the viscosity of aqueous solutions of the polyvinyl alcohol. Generally, the viscosity of a polyvinyl alcohol is reported in terms of the viscosity of a 4% aqueous solution of the polyvinyl alcohol at a temperature of 20° C.

For many uses of polyvinyl alcohol, high viscosity material is desirable, for example, for coating surfaces and for adhesives. For example, in coating paper to make a grease-proof paper, low viscosity aqueous solutions of polyvinyl alcohol are not suitable because they are absorbed by the paper, so that uncoated fibers extend above the coating. Low viscosity solutions thus fail to produce an adequate grease resistant coating on the paper. By applying to the paper a high viscosity solution, for example, one having a viscosity of 500 to 1000 centipoises or higher, a tightly adhering grease-proof film is produced on the paper which does not penetrate the paper to any great extent. For coating uses and for adhesive uses, heretofore, in order to obtain a sufficiently high viscosity aqueous solution of polyvinyl alcohol to apply to surfaces, it has been necessary to add extenders or thickeners such as starch, gelatin or the like, which coatings are less desirable than a coating of pure polyvinyl alcohol.

So-called polyvinyl alcohols may be produced having viscosities of 1000 centipoises and higher, say to 5000 or 10,000 centipoises in various ways but the products thus produced are not pure polyvinyl alcohols. For example, vinyl acetate may be copolymerized with various other polymerizable materials and the resulting copolymers hydrolyzed to produce types of polyvinyl alcohol, the properties of which are modified by the materials copolymerized with the vinyl acetate. For example, a high viscosity polyvinyl alcohol may be made by saponification of a copolymer of vinyl acetate with vinyl stearate. On hydrolysis, the vinyl acetate groups are preferentially removed, leaving the stearate groups largely unhydrolyzed; and the presence of the stearate groups in the resulting polyvinyl alcohol greatly increases the viscosity of the product. Likewise, the viscosities of polyvinyl alcohol made by hydrolyzing polyvinyl acetate may be increased by reacting the polyvinyl alcohol with various substances such as certain heavy metal salts, aldehydes, ketones or the like, which react with the hydroxyl groups of the polyvinyl alcohol. In these various methods of making high viscosity polyvinyl alcohols, careful control of the method is generally required to avoid producing a product which is insoluble in water and yet which has the desired high viscosity. Further, many of these polyvinyl alcohols are unstable; that is, under certain conditions they revert to a low viscosity material. For example, high viscosity polyvinyl alcohols made by reaction with certain heavy metal salts are not stable under acidic conditions; at a pH of 4 or less the metal compounds are decomposed causing the formation of the original low viscosity polyvinyl alcohol. Other high viscosity polyvinyl alcohol derivatives are unstable under alkaline conditions.

Heretofore there has been no suitable method for producing a pure polyvinyl alcohol by saponifying a straight polyvinyl acetate (i. e., a polyvinyl acetate which is not a copolymer), which polyvinyl alcohol has a viscosity above 300 centipoises and which is stable in aqueous solutions over a pH range of from 1 to 10. By careful control of reaction conditions it is possible to obtain polyvinyl alcohols by hydrolysis of polyvinyl acetate which are water soluble and which have viscosities as high as around 250 centipoises. However, heretofore it has not been possible to produce polyvinyl alcohols having viscosities much higher than about 250 centipoises merely by the hydrolysis of a pure polyvinyl acetate.

An object of the present invention is a new and improved method for the manufacture of polyvinyl alcohol. A further object is to produce a new form of polyvinyl alcohol having unusually high viscosities. Still further objects will be apparent from the following invention.

The above objects may be attained in accordance with the present invention by polymerizing vinyl acetate in the presence of a small amount of a terminally unsaturated mono-olefin having from 12 to 18 carbon atoms and saponifying the resulting polyvinyl acetate to such extent that at least about 75% of the acetate groups are converted to hydroxyl groups. By this process we are able to produce polyvinyl alcohols having (in 4% aqueous solution at 20° C.) viscosities many times 200 centipoises, e. g., 3000 to 20,000 centipoises.

Any of the conventional methods for polymerizing the vinyl acetate may be utilized, whether by polymerizing in solution, or in aqueous emulsion to produce either a granular polymer or a stable dispersion of the polymer. Thus, in practicing our invention we utilize a conventional method for polymerizing vinyl acetate except that we add to the reaction mixture prior to polymerization a small amount of a terminally unsaturated mono-olefin containing 12 to 18 carbon atoms. The resulting polyvinyl acetate generally does not differ appreciably from that obtained by utilizing the conventional polymerization method without the addition of the olefin, except that the viscosity of a methanol solution of the polyvinyl acetate thus made in some cases may be somewhat lower than that of polyvinyl acetate made without the addition of the aforesaid mono-olefin. However, when the polyvinyl acetate made by our method is saponified by reacting it with either water or an alcohol in the presence of either acidic or basic saponification catalyst, the resulting polyvinyl alcohol will have an unusually high viscosity, generally many times higher than that obtainable by hydrolysis of a polyvinyl acetate which has been prepared without the addition of the above mentioned mono-olefins.

The amount of the mono-olefin may vary from 0.01 to 10% of the weight of the vinyl acetate polymerized. Generally, we prefer to use around 0.05 to 2%.

The invention is illustrated by the following examples:

Example 1

This example shows the remarkable effects on the resulting polyvinyl alcohol obtained by the presence of a small amount of octadecene-1 in an emulsion polymerization of vinyl acetate and the subsequent hydrolysis of the polyvinyl acetate to polyvinyl alcohol. In a one-liter, three-necked polymerization flask provided with a sealed stirrer, thermometer well and reflux condenser, was placed 375 parts of water, 375 parts of vinyl acetate, 5 parts of 10% aqueous sodium bicarbonate solution, 4 parts of a 6% aqueous solution of polyvinyl alcohol having a saponification number between 127 and 157, 1 part octadecene-1 and 1.5 parts of 3% aqueous hydrogen peroxide. The materials were heated at reflux for 3 hours and 50 minutes with constant stirring. Finally 0.25 gram of diphenylamine was added and the residual vinyl acetate was steamed off. The polymerization was 93% complete after five hours and forty-five minutes. The material was cooled and the polymer granules filtered off and washed with distilled water. A molar benzene solution of the polyvinyl acetate had a viscosity of 238 centipoises at 20° C. The polyvinyl acetate was then hydrolyzed to form polyvinyl alcohol in the manner set forth in Example 3. Aqueous solutions of the resulting polyvinyl alcohol had the following viscosities at 20° C.

|  | Centipoises |
|---|---|
| 4% aqueous solution | 38,500 |
| 3% aqueous solution | 6,900 |
| 2% aqueous solution | 261 |
| 1% aqueous solution | 3.5 |

Example 2

This example illustrates the use of dodecene-1 as a polymerization-modifying agent in accordance with the present invention. The procedure of Example 1 was followed with the exception that instead of the octadecene, 7.6 parts of dodecene-1 was added to the vinyl acetate emulsion before initiating the polymerization. The polymerization was 96% complete after conducting the polymerization reaction for a period of 13 hours. The material was cooled and the polymer granules filtered off and washed with distilled water. A molar benzene solution of the polyvinyl acetate had a viscosity of 143 centipoises at 20° C. The polyvinyl acetate was then hydrolyzed to form polyvinyl alcohol in the manner set forth in Example 1. A 4% aqueous solution of the polyvinyl alcohol had a viscosity of 3315 centipoises at 20° C.

Example 3

A total of 200 cc. of a mixture of 8 parts by weight of vinyl acetate to 2 parts by weight of methanol together with 0.4% by weight of benzoyl peroxide and 1% by weight of octadecene-1 based on vinyl acetate was placed in a reaction vessel with a stirrer and reflux condenser. This mixture was stirred and heated to a temperature of 58 to 64° C. until a test showed that sufficient of the vinyl acetate had polymerized to give a polymer concentration of 35 to 40% by weight. Another mixture of the same ingredients in the same proportions then was slowly added to the reaction vessel with continuous heating and stirring at a rate of addition of about 2 cc. per minute for a period of 280 minutes. The resulting methanol solution of polyvinyl acetate containing some unpolymerized vinyl acetate was then diluted by the addition of methanol and transferred to another vessel, where a small amount of thiourea was added for the purpose of stopping the polymerization reaction. Unreacted vinyl acetate was removed by passing hot methanol vapor through the solution leaving a solution of substantially pure polyvinyl acetate in methanol. The polymer was hydrolyzed by adding a small amount of sodium methylate catalyst to the solution and heating and stirring until hydrolysis was substantially complete. The resulting polyvinyl alcohol precipitate was filtered off and dried. The product was water soluble, producing very viscous aqueous solutions; the viscosity at 20° C. was 20,000 centipoises.

Example 4

The process of Example 3 was again repeated except that in this case the octadecene-1 was added to the polymerization reaction mixture in an amount equal to 0.5% of the weight of the vinyl acetate. The polyvinyl alcohol produced by saponifying the resulting polyvinyl acetate had a viscosity of 98 centipoises.

As illustrated by the above examples, various conventional methods for polymerizing vinyl acetate and for hydrolyzing or saponifying the resulting polyvinyl acetate may be employed in practicing our invention. Equally good results may be obtained, for example, by emulsion polymerization or by solution polymerization of the vinyl acetate. It should be noted, however, that in carrying out solution polymerization in accordance with the present invention, large amounts of a solvent such as methanol should be avoided and in any case the amount of such solvent must be less than the weight of the vinyl acetate in the initial polymerization reaction mixture. We have found that excessive quantities of methanol tend to cause the formation of a polymer which when saponified yields relatively low viscosity polyvinyl alcohol; if the amount of methanol is greater than the weight of the vinyl acetate in the initial polymerization reaction mixture, it is impossible to obtain a polyvinyl alcohol whose aqueous solution at 4% concentration at 20° C. will have a viscosity higher than 200 to 300 centipoises despite the addition of the herein described mono-olefins. Preferably, in conducting solution polymerizations according to our invention, we prefer that the amount of solvent be from about 20 to 30% of the weight of the vinyl acetate. Still much lower amounts of solvent may be used if desired or the polymerization may be carried out in the absence of any solvent, e. g., by massive polymerization in which the vinyl acetate is neither dissolved nor dispersed in another liquid, nor in emulsion polymerizations wherein the monomeric vinyl acetate is dispersed in water or other non-solvent, with or without addition of an emulsifying agent. Thus, in conducting the polymerization of the vinyl acetate the amount of solvent may vary from zero to less than 100% (e. g., around 90%) of the weight of the vinyl acetate.

The various conventional methods for saponifying the polyvinyl acetate may be utilized, e. g., saponification in solution in solvents such as methyl acetate, methanol, ethanol or mixtures thereof, or in aqueous media. In such saponification operations the catalyst may be either a basic material such as an alkali or an alkali metal alcoholate such as sodium methylate or the like, or an acidic catalyst such as sulfuric acid, hydrochloric acid or the like. Generally, we prefer to substantially completely saponify the polyvinyl acetate but partially saponified products are also within the scope of the invention. In any event, however, we saponify the polyvinyl acetate to the extent necessary to produce a water soluble product, which generally requires the conversion of at least about 75% of the acetate groups into hydroxyl groups.

The term "saponification" as used herein and in the appended claims is used in the generic sense, to signify the reaction of an ester with water, an alkali or an alcohol to produce the alcohol of the ester and the acid thereof, its alkaline salt or ester, respectively. We prefer to saponify the polyvinyl acetate by reaction with an alcohol in the presence of an acid or alkaline catalyst, e. g., by reaction with methanol, using sodium methylate as catalyst.

The novel products of our invention are high viscosity grades of polyvinyl alcohol having viscosities generally exceeding 1000 centipoises in terms of the viscosity of a 4% solution in water at 20° C. The invention, however, is not restricted to making such unusually high viscosity grades of polyvinyl alcohol, but polyvinyl alcohol of lower viscosity grades, for example, viscosities of from 50 to 500 centipoises, may be made by varying the amount of the mono-olefin added during the polymerization reaction. For example, by using an amount of mono-olefin equal to from 0.1 to 0.2% of the vinyl acetate, polymerizing in methanol solution, polyvinyl alcohols having viscosities in the region of 50 to 150 centipoises may be produced. In producing such relatively low viscosity products, the already known effects of varying polymerization conditions on the viscosity of the resulting polyvinyl alcohol must be taken into account. For example, by carrying out the polymerization procedure which in the absence of added mono-olefin produces a polyvinyl acetate which when hydrolyzed produces a polyvinyl alcohol having a viscosity of, say 50 centipoises, by the addition of a few tenths of a percent of a terminally unsaturated mono-olefin having from 12 to 18 carbon atoms, the viscosity may be raised to around 150 centipoises or higher.

The novel products of our invention having viscosities of higher than 300 centipoises are substantially pure polyvinyl alcohols, by which term we mean the product obtained by hydrolyzing a polymer of vinyl acetate (which is not a copolymer) until at least about 75% of the acetate groups have been converted into hydroxyl groups. Thus, in case the hydrolysis is carried out to completion so that the acetate groups are completely hydrolyzed to hydroxyl groups, the products of our invention may be represented by the following formula: $(-CH_2-CHOH-)_n$, wherein $n$ is the whole number indicating the number of molecules of vinyl alcohol combined in the polymer; and at least 98% by weight of the product will correspond to this formula. While the product often may contain a very small amount of the mono-olefin used, it appears doubtful that the mono-olefin has copolymerized with the vinyl acetate, since on saponification of the polyvinyl acetate, the bulk of the mono-olefin added may be found in the medium (alcohol or water) in which the saponification occurred.

The presence of mono-olefins having less than 12 carbon atoms in the polymerization of vinyl acetate, according to our experience, does not serve to produce the novel high viscosity polyvinyl alcohols obtainable by practice of the present invention. Olefins having more than 5, but less than 12, carbon atoms, e. g., octene-1 or cyclohexene, when added to a vinyl acetate polymerization, often substantially lower the viscosity of the resulting polyvinyl acetate, but the viscosity of the polyvinyl alcohol made therefrom generally will be low, e. g., 60 to 70 centipoises. Still lower olefins, such as ethylene, under suitable conditions may be made to copolymerize and the hydrolysis products of such copolymers may have high viscosities. However, to produce water soluble polyvinyl alcohols by hydrolysis of ethylene/vinyl acetate copolymers, the proportion of ethylene copolymerized must be controlled within certain limits; otherwise the product either will have a relatively low viscosity or will not be water soluble.

We claim:

1. A process for the production of polyvinyl alcohol which comprises polymerizing vinyl acetate in the presence of a terminally unsaturated mono-olefin containing 12 to 18 carbon atoms the amount of said mono-olefin being equal to 0.01 to 10% of the weight of said vinyl acetate and the amount of any vinyl acetate solvent present during polymerization varying from zero to 30% by weight of the vinyl acetate and saponifying the resulting polyvinyl acetate until at least about 75% of the acetate groups have been converted to hydroxyl.

2. A process for the production of polyvinyl alcohol which comprises polymerizing vinyl acetate initially dissolved in less than 30% of its weight of a solvent for vinyl acetate, in the presence of 0.05 to 2% by weight of the vinyl acetate of a terminally unsaturated mono-olefin containing 12 to 18 carbon atoms and saponifying the resulting polyvinyl acetate until at least about 75% of the acetate groups have been converted to hydroxyl groups.

3. A process for the production of polyvinyl alcohol which comprises polymerizing vinyl acetate initially dissolved in about 20 to 30% of its weight of methanol in the presence of 0.05 to 2% by weight of the vinyl acetate of a terminally unsaturated mono-olefin containing 12 to 18 carbon atoms and saponifying the resulting polyvinyl acetate until at least about 75% of the acetate groups have been converted to hydroxyl groups.

4. A process for the production of polyvinyl alcohol which comprises polymerizing substantially undissolved vinyl acetate in aqueous dispersion in the presence of 0.05 to 2% by weight of the vinyl acetate of a terminally unsaturated mono-olefin containing 12 to 18 carbon atoms and saponifying the resulting polyvinyl acetate until at least about 75% of the acetate groups have been converted to hydroxyl.

5. A process for the production of a polyvinyl alcohol a 4% by weight aqueous solution of which, at 20° C., has a viscosity exceeding 300 centipoises, which comprises polymerizing vinyl acetate in solution in 20 to 30% of its weight of methanol in the presence of an amount of dodecene-1 equal to about 1 to 2% by weight of the vinyl acetate and saponifying the resulting polyvinyl acetate until at least about 75% of the acetate groups have been converted to hydroxyl.

6. A process for the production of a polyvinyl alcohol a 4% by weight aqueous solution of which, at 20° C., has a viscosity exceeding 300 centipoises, which comprises polymerizing vinyl acetate in solution in 20 to 30% of its weight of methanol in the presence of an amount of octadecene-1 equal to about 1 to 2% by weight of the vinyl acetate and saponifying the resulting polyvinyl acetate until at least about 75% of the acetate groups have been converted to hydroxyl.

7. A process for the production of a polyvinyl alcohol, a 4% by weight aqueous solution of which, at 20° C., has a viscosity exceeding 300 centipoises, which comprises polymerizing substantially undissolved vinyl acetate in aqueous dispersion in the presence of an amount of dodecene-1 equal to about 1 to 2% by weight of the vinyl acetate and saponifying the resulting polyvinyl acetate until at least about 75% of the acetate groups have been converted to hydroxyl.

8. A process for the production of a polyvinyl alcohol a 4% by weight aqueous solution of which, at 20° C., has a viscosity exceeding 300 centipoises, which comprises polymerizing substantially undissolved vinyl acetate in aqueous dispersion in the presence of an amount of octadecene-1 equal to about 1 to 2% by weight of the vinyl acetate and saponifying the resulting polyvinyl acetate until at least about 75% of the acetate groups have been converted to hydroxyl.

HAROLD W. BRYANT.
WILLIAM R. CORNTHWAITE.

References Cited in the file of this patent

UNITED STATES PATENTS

| Number | Name | Date |
| --- | --- | --- |
| 2,363,297 | D'Alelio | Nov. 21, 1944 |
| 2,386,347 | Roland | Oct. 9, 1945 |
| 2,421,971 | Sperati | June 10, 1947 |
| 2,467,774 | Plambeck | Apr. 19, 1949 |
| 2,499,924 | Lavin | Mar. 7, 1950 |

FOREIGN PATENTS

| Number | Country | Date |
| --- | --- | --- |
| 526,497 | Germany | Sept. 25, 1933 |

OTHER REFERENCES

Du Pont, R. & H., Chemicals Department, "Polyvinyl Acetate," a 4 page photostat stamped September 1941, page 2 is cited.